US006329033B2

(12) United States Patent
Soproni

(10) Patent No.: US 6,329,033 B2
(45) Date of Patent: *Dec. 11, 2001

(54) IMITATION WAX SEAL

(76) Inventor: Zoltan Soproni, 7887 Dunbrook Rd., Suite C, San Diego, CA (US) 92126

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,727

(22) Filed: Jan. 8, 1999

Related U.S. Application Data

(60) Provisional application No. 60/074,035, filed on Feb. 9, 1998.

(51) Int. Cl.[7] ........ B32B 27/00

(52) U.S. Cl. ........ 428/40.1; 40/616; 428/40.9; 428/41.3; 428/42.1; 428/42.2; 428/915; 428/916

(58) Field of Search ........ 428/40.1, 41.3, 428/42.1, 42.2, 40.9, 915, 916; 40/616

(56) References Cited

U.S. PATENT DOCUMENTS

| | | | | |
|---|---|---|---|---|
| 4,149,738 | * | 4/1979 | Illos | 283/8 |
| 4,595,351 | * | 6/1986 | Dickson | 425/114 |
| 5,154,448 | * | 10/1992 | Griffin | 283/102 |

FOREIGN PATENT DOCUMENTS

| | | | |
|---|---|---|---|
| 2593952 | * | 8/1987 | (FR) . |
| 58-8774 | * | 1/1993 | (JP) . |

* cited by examiner

*Primary Examiner*—Nasser Ahmad
(74) *Attorney, Agent, or Firm*—Henri J. A. Charmasson; John D. Buchaca

(57) ABSTRACT

An imitation wax seal suitable for application to a document, package or container is injection-molded out of a semi-rigid plastic, then coated in the back with an adhesive temporarily protected by a peelable film. The fabrication mold accepts a variety of substitutable center escutcheon that can carry a variety of letters, symbols, and logo types. The seal is flexible enough to pass through post office automatic sorting and canceling equipment without breaking or coming loose. The seal is impregnated with a bee-wax scent or other pleasant fragrance.

8 Claims, 1 Drawing Sheet

IMITATION WAX SEAL

PRIOR APPLICATION

This is a continuation of provisional application Serial No. 60/074,035 filed Feb. 9, 1998.

FIELD OF THE INVENTION

This invention relates to insignias, seals, decorative buttons and more particularly to plastic substitutes for natural wax seals.

BACKGROUND OF THE INVENTION

Wax seals have been used since antiquity to guarantee the integrity and authenticity of documents The traditional bee-wax or tallow-wax seal is formed by applying a glob of melted wax on a document, ribbon or fastener, then stamping the melted glob with a brass seal engraved with a mirror image of the desired design.

Nowadays, this type of wax seal is seldom used to certify a document, but survives only as a decorative element that lends class and distinction to a diploma, award certificate, or personal missive.

Traditional wax seals are very brittle, and cannot survive the sorting and canceling machines used in most post offices Their debris can interfere with the good operation of that type of equipment. Accordingly, envelopes bearing a natural wax seal must be hand-delivered to a post office where they are manually canceled and sorted.

Brass seals are relatively expensive. Moreover, the whole process of melting the wax, applying a glob of it to the document, then stamping it is awkward for most people and is often botched.

SUMMARY OF THE INVENTION

The principal and secondary objects of this invention are to provide a customized decorative seal of pleasant appearance and fragrance that has the exact appearance of a traditional wax seal, can be conveniently applied to a document without heat, and is flexible enough to pass through the handling, sorting and canceling equipment of the post office without breaking or coming loose.

These and other valuable objects are achieve by a thin plastic slug formed in an injection mold and having a central part decorated with lettering, a blazon or logo type. A section of double-sided adhesive tape temporarily protected by a peelable film is applied to the back of the slug. The plastic material is impregnated with a pleasant fragrance essence

DESCRIPTION OF THE PREFERRED EMBODIMENT OF THE INVENTION

Figure 1:
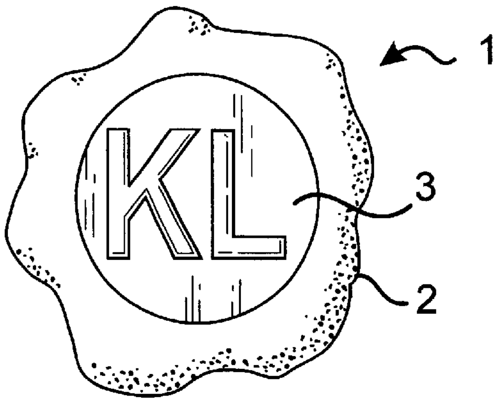
FIG. 1 is a top plan view of a seal according to the invention.
Figure 2:
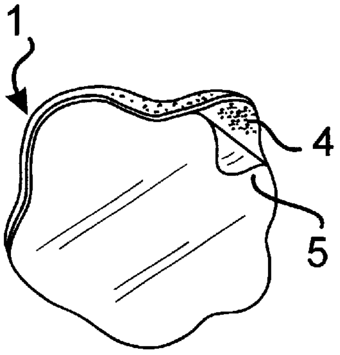
FIG. 2 is a back perspective view of the seal showing the adhesive layer.
Figure 3:
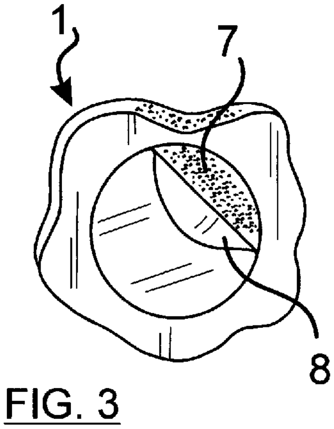
FIG. 3 illustrates an alternate adhesion method.

Referring now to the drawing, there is shown in FIG. 1 a slug made in an injection mold from a choice of colored and scented plastic material such as polypropylene. Alternately, the slug may be made of a metal-resin composite such as those available from LuminOre, Inc. of Encinitas, California. The slug 1 has the random outline 2 and general profile of a traditional wax seal. The central portion 3 which is formed by a substitutable coin in the injection mold carries a design which can be one or a set of initials, a blazon, or a logo type or other informative sign. Accordingly, the seal can be readily customized. In addition the surface of design design carried by the seal may be pad-printed or hot-stamped to impart special shapes or colors. A double-sided adhesive tape 4 temporarily protected by a peelable film 5 is applied to the flat back of the slugs as shown in FIG. 2. In lieu of the double-sided adhesive tape, a dot 7 of high-tack adhesive, such as an acrylic glue, also protectively covered by a peelable film 8 may be applied to the back of the slugs as shown in FIG. 3.

After having peeled the film, the user simply applies the seal with a thumb pressure.

Figure 4:
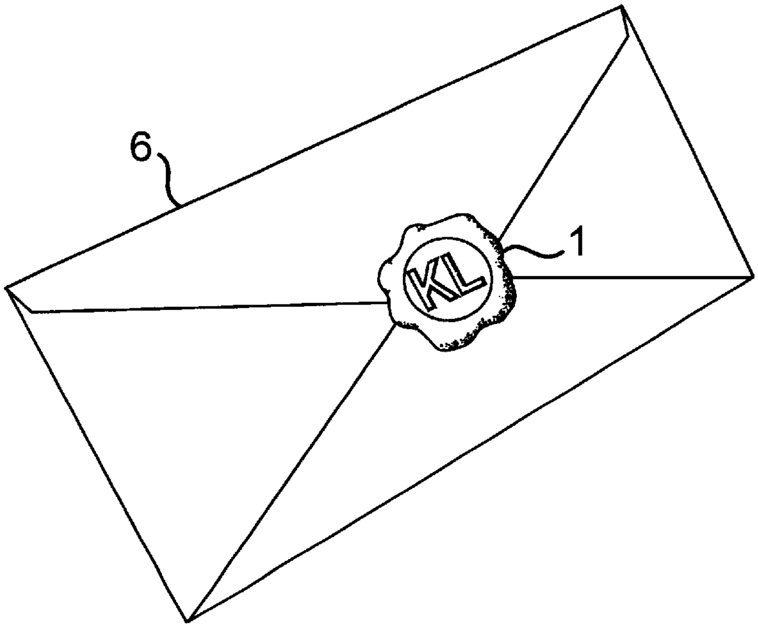
FIG. 4 shows a seal applied on an envelope.

The thickness of the slug should not exceed 1.58 millimeters (62 mils), and is preferably kept around 1.2 millimeters (45 mils). These dimensions yield a slightly flexible seal that can pass through post office handling, sorting and canceling equipment without breaking or coming loose. Accordingly, as shown in FIG. 4, the seal 1 can be conveniently used to seal a letter 6. A similar seal can be used on other types of documents such as a diploma, an award certificate, or a ribbon and similar fasteners. The seal can also be used to personalize a gift by applying it to its container, accompanying tag, or on the gift item itself.

What is claimed is:

1. An imitation wax seal which comprises:

a slug of molded synthetic material shaped and dimensioned to resemble a stamped glob of hot wax, said slug having a top face embossed with a sign, a substantially flat bottom face and a thickness of no more than 1.58 millimeters; and means for securing said bottom face on a receiving surface without heating said slug.

2. The structure of claim 1, wherein said means for securing comprise:

a double-sided portion of adhesive tape having a first side applied against said bottom face, and a second opposite side; and a peelable protective film applied to said second side.

3. The structure of claim 1, wherein said means for securing comprise:

a layer of adhesive applied to said bottom face; and a peelable protective film covering said layer.

4. The structure of claim 1, wherein said material is a polypropylene.

5. The structure of claim 1, wherein said material is a metal-resin composite.

6. The structure of claim 4, wherein said material includes a fragrant essence.

7. The structure of claim 1, wherein said sign comprises initials.

8. The combination of a document with an imitation wax seal wherein said imitation wax seal comprises:

a slug of molded synthetic material shaped and dimensioned to resemble a stamped glob of hot wax, said slug having a top face embossed with a sign, a substantially flat bottom face and a thickness of no more than 1.58 millimeters; and means for securing said bottom face on said document without application of heat to said slug.

* * * * *